(12) United States Patent
Cheng

(10) Patent No.: US 8,002,363 B2
(45) Date of Patent: Aug. 23, 2011

(54) QUICK RELEASE STRUCTURE FOR FRONT WHEEL OF BABY STROLLER

(76) Inventor: Pao-Hsien Cheng, Tainan Hsien (TW)

( * ) Notice: Subject to any disclaimer, the term of this patent is extended or adjusted under 35 U.S.C. 154(b) by 177 days.

(21) Appl. No.: 12/461,831

(22) Filed: Aug. 26, 2009

(65) Prior Publication Data

US 2011/0049967 A1 Mar. 3, 2011

(51) Int. Cl.
*B60B 33/02* (2006.01)

(52) U.S. Cl. ............ 301/111.06; 301/111.05; 301/119; 301/121; 16/30; 16/31 A; 16/35 R; 16/38

(58) Field of Classification Search ............ 301/111.01, 301/111.05, 111.06, 111.07, 119, 121; 16/18 R, 16/45, 46, 30, 38, 39, 31 A, 31 R, 35 R, 43
See application file for complete search history.

(56) References Cited

U.S. PATENT DOCUMENTS

| | | | | |
|---|---|---|---|---|
| 4,570,288 A * | 2/1986 | Kassai | | 16/35 R |
| 5,172,451 A * | 12/1992 | Chiu | | 16/35 R |
| 5,390,394 A * | 2/1995 | Huang | | 16/30 |
| 5,408,723 A * | 4/1995 | Julien et al. | | 16/30 |
| 5,509,172 A * | 4/1996 | Lauro | | 16/30 |
| 6,024,416 A * | 2/2000 | Chen et al. | | 301/121 |
| 6,120,106 A * | 9/2000 | Liao | | 301/111.06 |
| 6,212,733 B1 * | 4/2001 | Yeh | | 16/35 R |
| 6,722,744 B1 * | 4/2004 | Shieh | | 301/119 |

FOREIGN PATENT DOCUMENTS

JP 03178804 A * 8/1991
WO WO 9401292 A1 * 1/1994

* cited by examiner

*Primary Examiner* — Russell D Stormer
(74) *Attorney, Agent, or Firm* — Rosenberg, Klein & Lee

(57) ABSTRACT

A quick release structure for front wheels of baby strollers includes an upper mount disposed on one leg support thereof. A fixing pin is arranged on the upper mount for inserting into a locking hole on the leg support. Moreover, a lower mount assembled with a wheel is set on the bottom of the upper mount. A connection rod at the top of the lower mount is inserted into the upper mount. A fixing groove for locking with the fixing pin is formed around the side wall close to the top of the connection rod. A positioning slot is provided on the bottom of the upper mount for mounting a L-shaped positioning rod pivoted on the lower mount. Thus the stroller can keep moving forward without changes in directions by pressing the positioning rod to be locked into the positioning slot for the purposes of easy assembling, storage and transportation.

4 Claims, 7 Drawing Sheets

QUICK RELEASE STRUCTURE FOR FRONT WHEEL OF BABY STROLLER

BACKGROUND OF THE INVENTION

1. Fields of the Invention

The present invention relates to a quick release structure for front wheels of baby strollers, especially to a quick release structure for front wheels of baby strollers that includes an upper mount and a lower mount for easy assembling and disassembling of wheels so as to achieve purposes of convenient assembling, storage and transportation.

2. Descriptions of Related Art

As shown in FIG. 7, baby strollers available now include a body (4) with a plurality of leg supports (41). An insertion hole (411) is arranged near a bottom end of the leg support (41) for insertion of a bolt (412). A connection rod (421) of a wheel (42) is connected with the bottom end of the leg support (41). By the bolt (412), the wheel (42) is assembled with the leg support (41) for easy movement of the body (4).

However, in practice, the above strollers have following shortcomings:
1. Each wheel is disposed on the bottom of the leg support of the body by respective bolt. The leg supports and wheels are set separately during storage and transportation. Thus the bolts are fastened respectively during assembling processes. This leads to inconvenience and trouble for users.
2. There is no positioning member disposed on the wheels of the above baby strollers. Once users want to go forward in a straight line, the strollers are easy to have a change in direction due to rotation of the wheels.

SUMMARY OF THE INVENTION

Therefore it is a primary object of the present invention to provide a quick release structure for front wheels of baby strollers that includes an upper mount and a lower mount that favors easy assembling or disassembling so as to achieve purposes of convenient assembling, storage and transportation. Moreover, the upper mount and the lower mount respectively are disposed with a positioning slot and a positioning rod, corresponding to each other. Thus each wheel on front side of a stroller body moves straight without any changes in directions by pressing of the positioning rod of the lower mount to be locked into the positioning slot of the upper mount.

The quick release structure for front wheels of baby strollers of the present invention features on that: the baby stroller includes a stroller body with leg supports and each leg support is disposed with an upper mount. The upper mount is arranged with a fixing pin whose top end of the fixing pin is bent vertically to form a bending segment. A locking hole is disposed on a side wall of the leg support for mounting the bending segment of fixing pin. Moreover, a lower mount assembled with a wheel is set on the bottom of the upper mount. Furthermore, a connection rod is disposed at the top of the lower mount projectingly and the connection rod inserts into the upper mount. A fixing groove for locking with the bending segment on top of the fixing pin is arranged around the connection rod, near the top end thereof. As to the lower mount, it is pivoted with an L-shaped positioning rod on one end thereof and a corresponding positioning block is set on one end of the positioning rod, near the connection rod. A positioning slot is disposed on the bottom of the upper mount for mounting the positioning block of the positioning rod.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
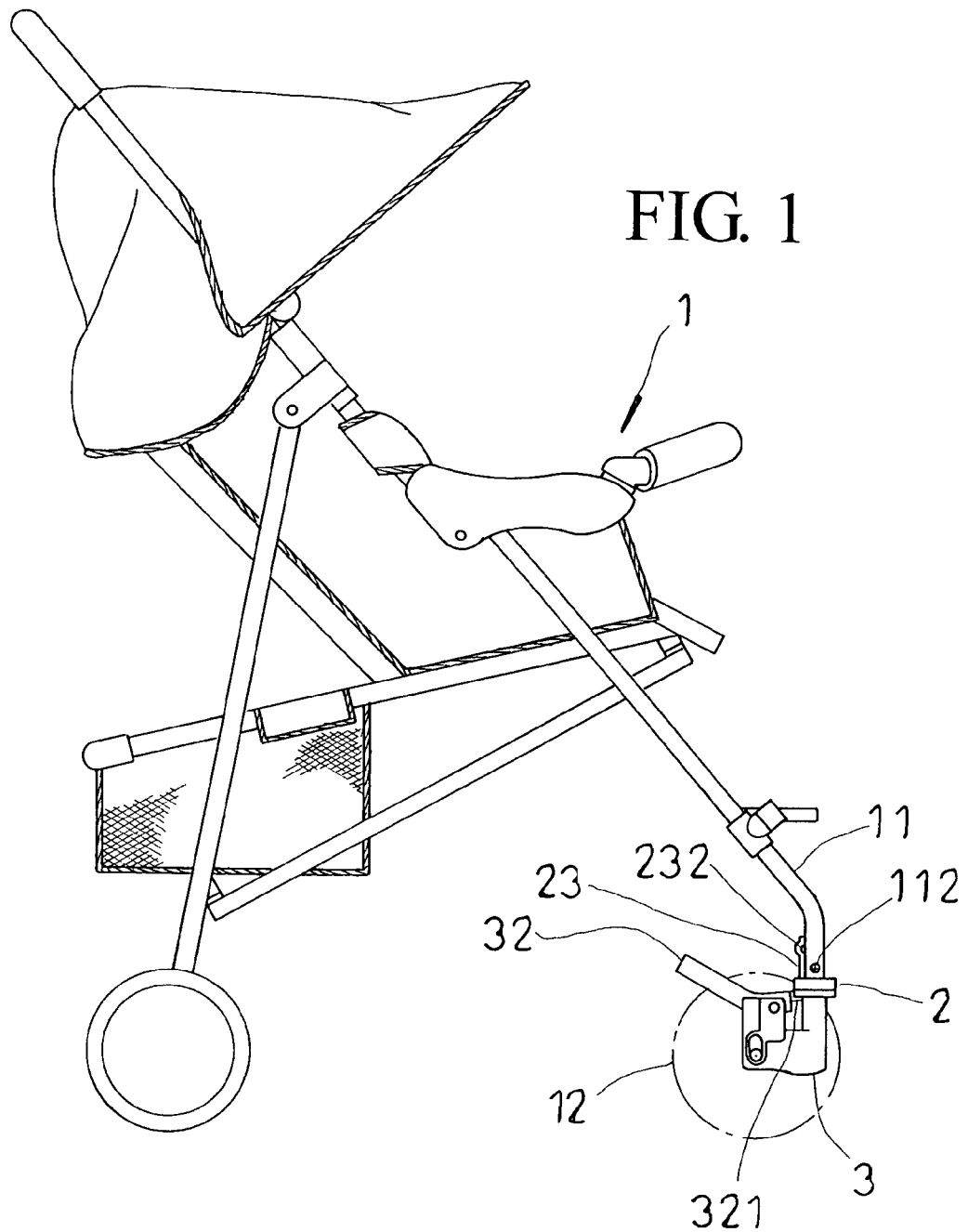
FIG. 1 is a side view of an embodiment according to the present invention.
Figure 2:
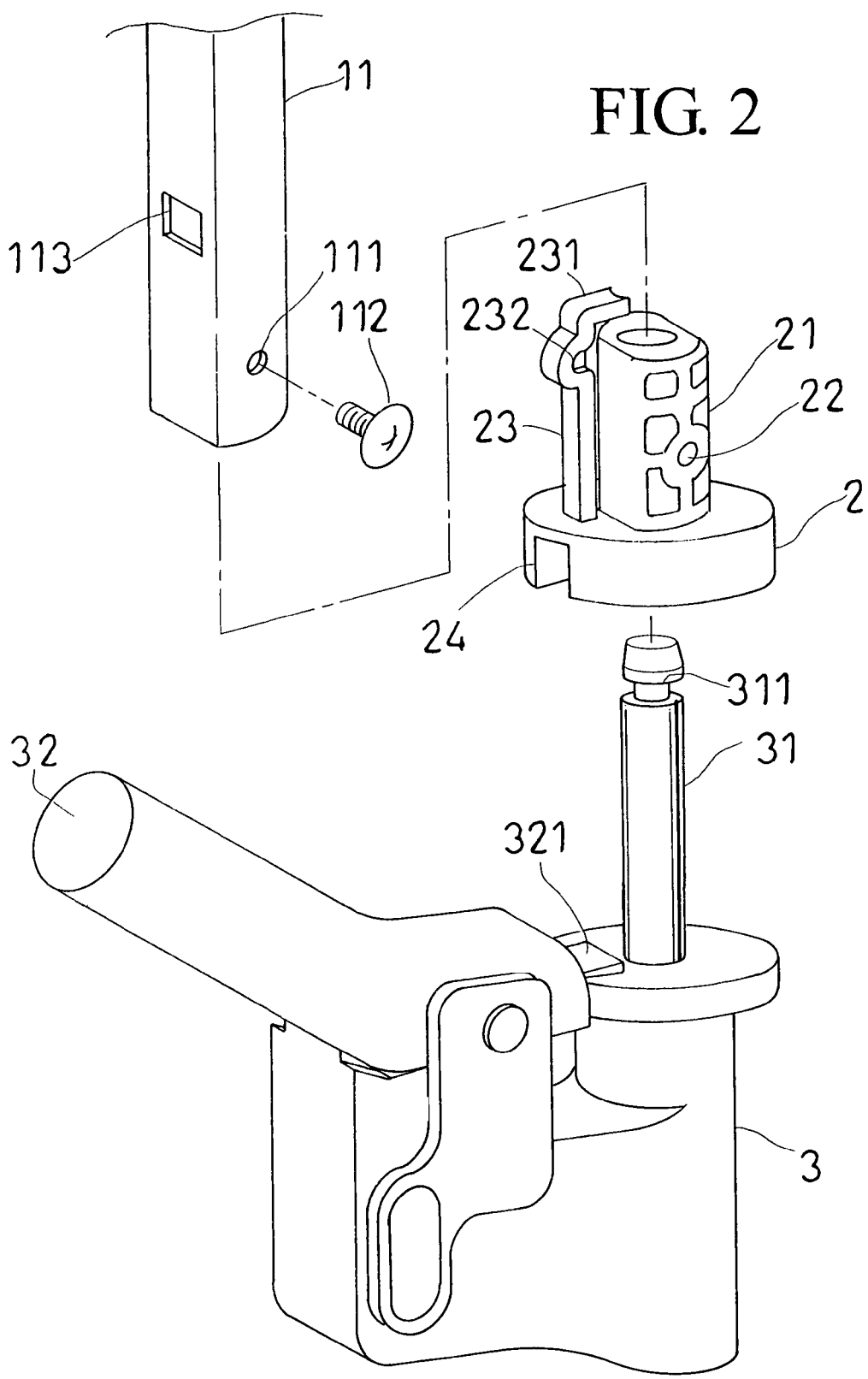
FIG. 2 is an explosive view of an embodiment according to the present invention.

Refer to FIG. 1 and FIG. 2, a quick release structure for front wheels of baby strollers according to the present invention consists of a stroller body (1), an upper mount (2) and a lower mount (3).

The stroller body (1) is disposed with a plurality of leg supports (11) and a wheel is arranged at a bottom end of the leg support (11) for movement of the stroller body (1). An insertion hole (111) with a bolt (112) is mounted on a side wall of the leg support (11) so as to assemble the leg support (11) with the upper mount (2). A locking hole (113) is disposed on another side wall of the leg support (11) for mounting a fixing pin (23) of the upper mount (2).

A connecting cylinder (21) is arranged vertically at a top of the upper mount (2). A bolt hole (22) is mounted on a side wall of the connecting cylinder (21) for fastening of the bolt (112) of the leg support (11). The fixing pin (23) is disposed at one side of the connecting cylinder (21) in parallel. The top end of the fixing pin (23) is bent to form a bending segment (231) that is inserted into the locking hole (113) of the leg support (11). Moreover, a slot (232) that helps movement of the fixing pin (23) is formed under the bending segment (231). Furthermore, a positioning slot (24) is arranged at the bottom of the upper mount (2) for mounting a positioning rod (32) of the lower mount (3).

A connection rod (31) is arranged projectingly at the top of the lower mount (3) and a fixing groove (311) is disposed around the connection rod (31), near the top end thereof, for locking with the bending segment (231) of the fixing pin (23). As to the lower mount (3), it is pivoted with an L-shaped positioning rod (32) on one end thereof and a corresponding positioning block (321) is set on one end of the positioning rod (32), near the connection rod (31). The positioning block (321) is mounted into the positioning slot (24) on the bottom of the upper mount (2).

Figure 3:
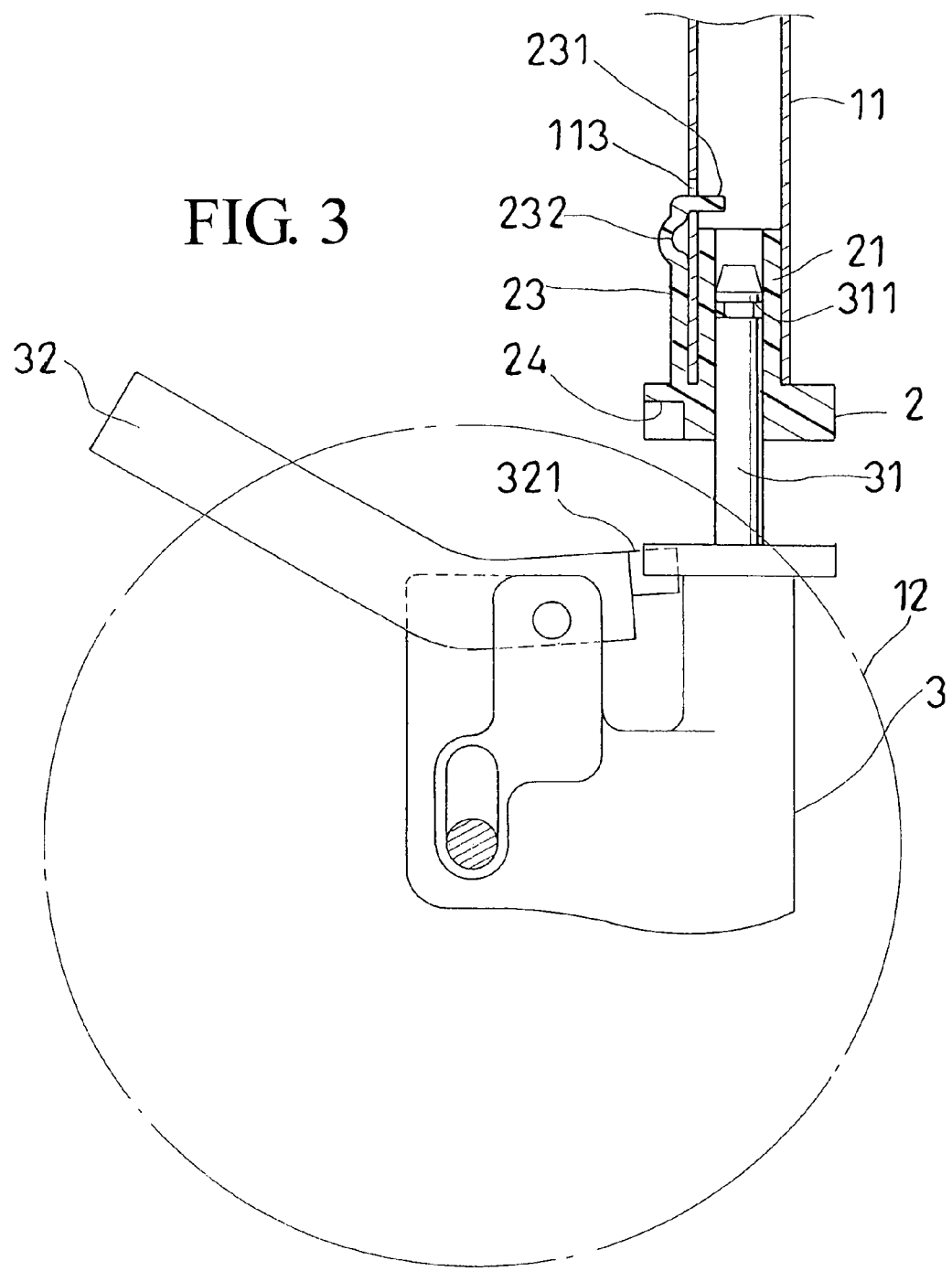
FIG. 3 is a schematic drawing showing a connection rod inserted into a connecting cylinder of an embodiment according to the present invention.
Figure 4:
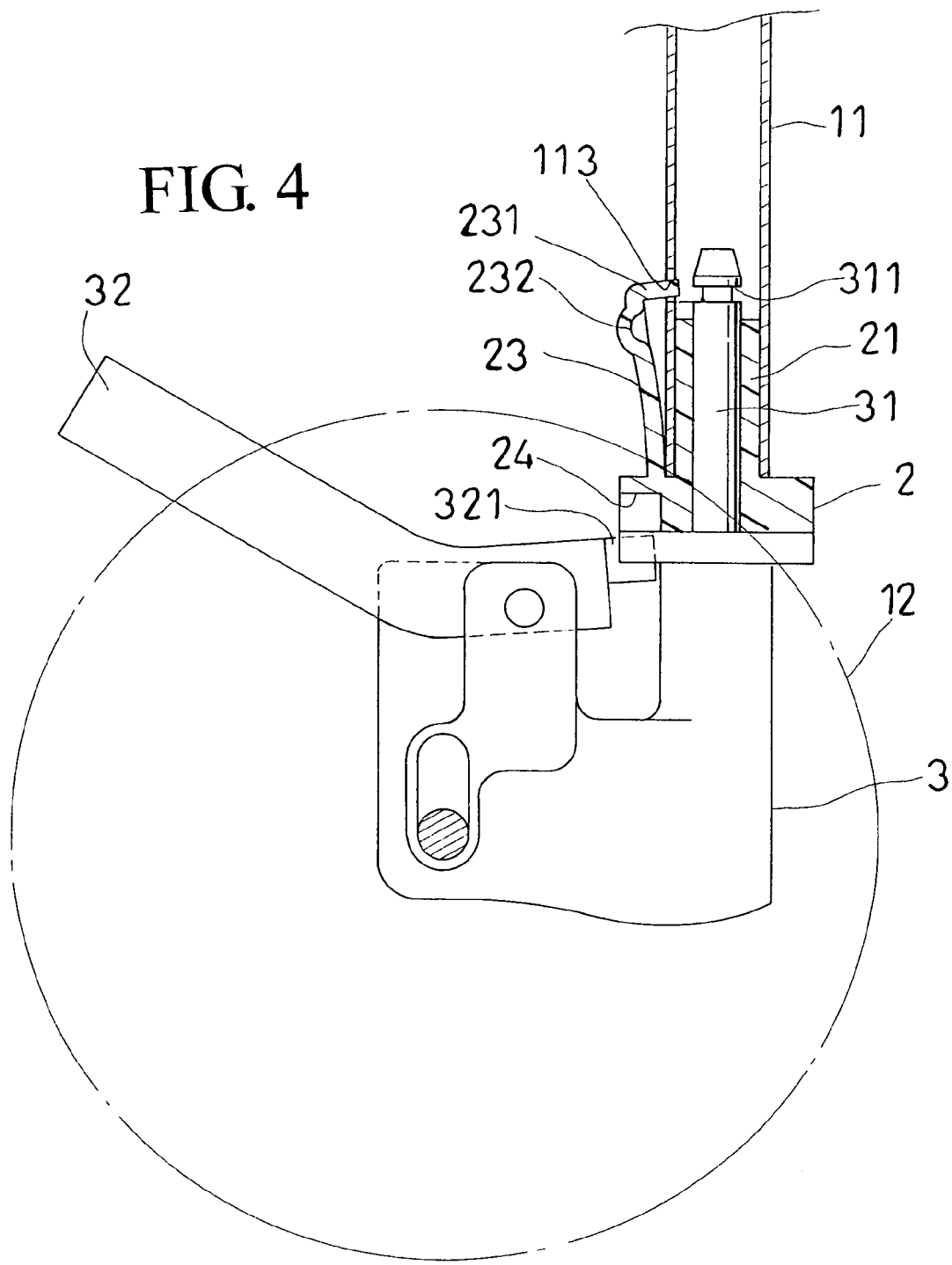
FIG. 4 is a schematic drawing showing the connection rod completely inserted through the connecting cylinder of an embodiment according to the present invention.
Figure 5:
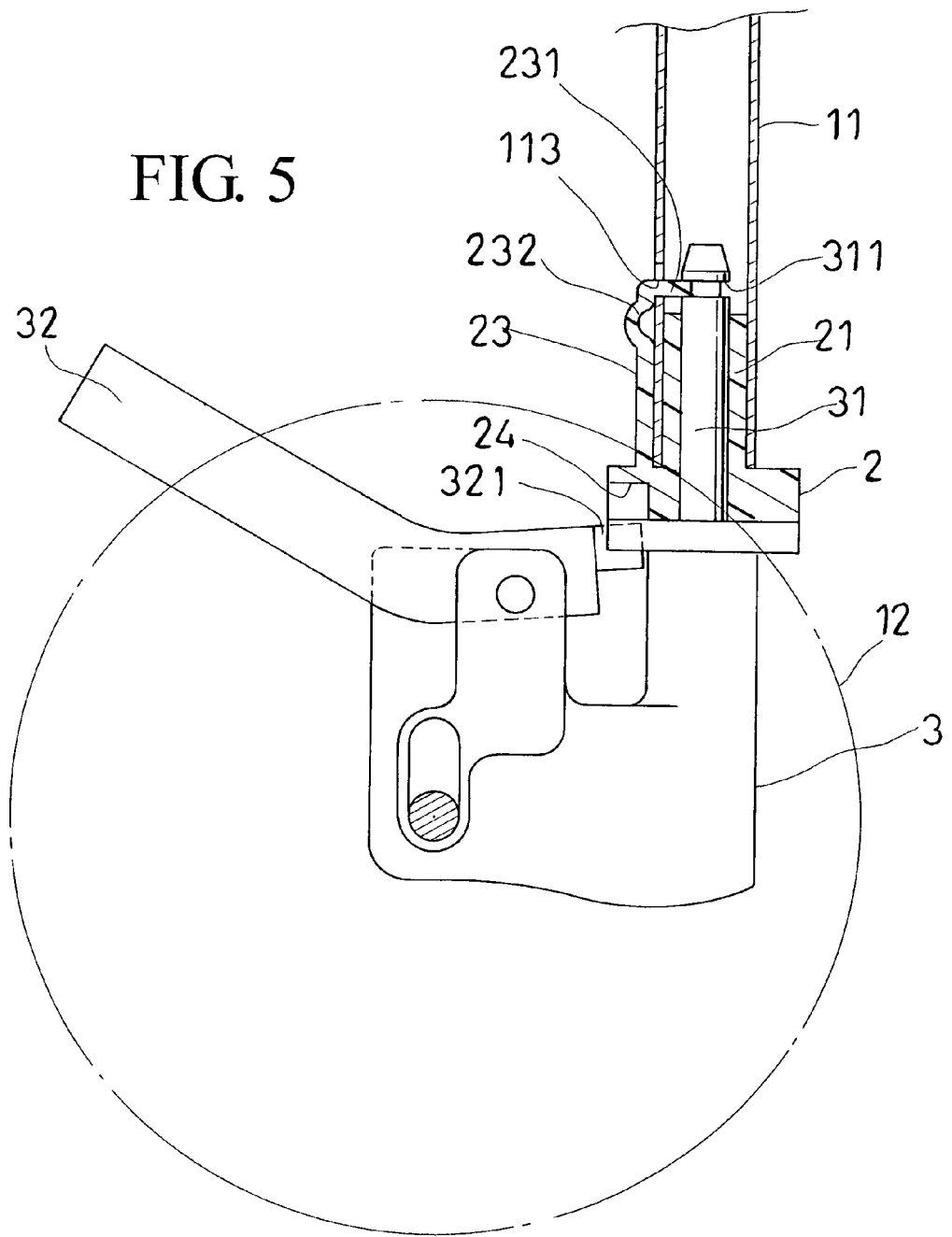
FIG. 5 is a schematic drawing showing a bending segment locked into a fixing groove of an embodiment according to the present invention.

While being assembled, refer to FIG. 1 and FIG. 3, the connecting cylinder (21) on top end of the upper mount (2) is inserted into the bottom end of the leg support (11) on the front end of the stroller body (1). Refer to FIG. 4 and FIG. 5, the fixing pin (23) of the upper mount (2) is assembled with the leg support (11) by the bending segment (231) locking into the locking hole (113) of the leg support (11) from outer side of the leg support (11). And each wheel (12) on front end of the stroller body (1) is assembled with each lower mount (3). Then by the connection rod (31), the lower mount (3) together with the wheel (12) is inserted into the connecting cylinder (21) of the upper mount (2). Thus the top end of the connection rod (31) inserts out of the connecting cylinder (21) and the bending segment (231) on top end of the fixing pin (23) is locked into the fixing groove (311) of the connection rod (31) so as to connect each lower mount (3) with the wheel (12) to the bottom end of the corresponding leg support (11). Therefore, the convenient assembling is achieved.

Figure 6:
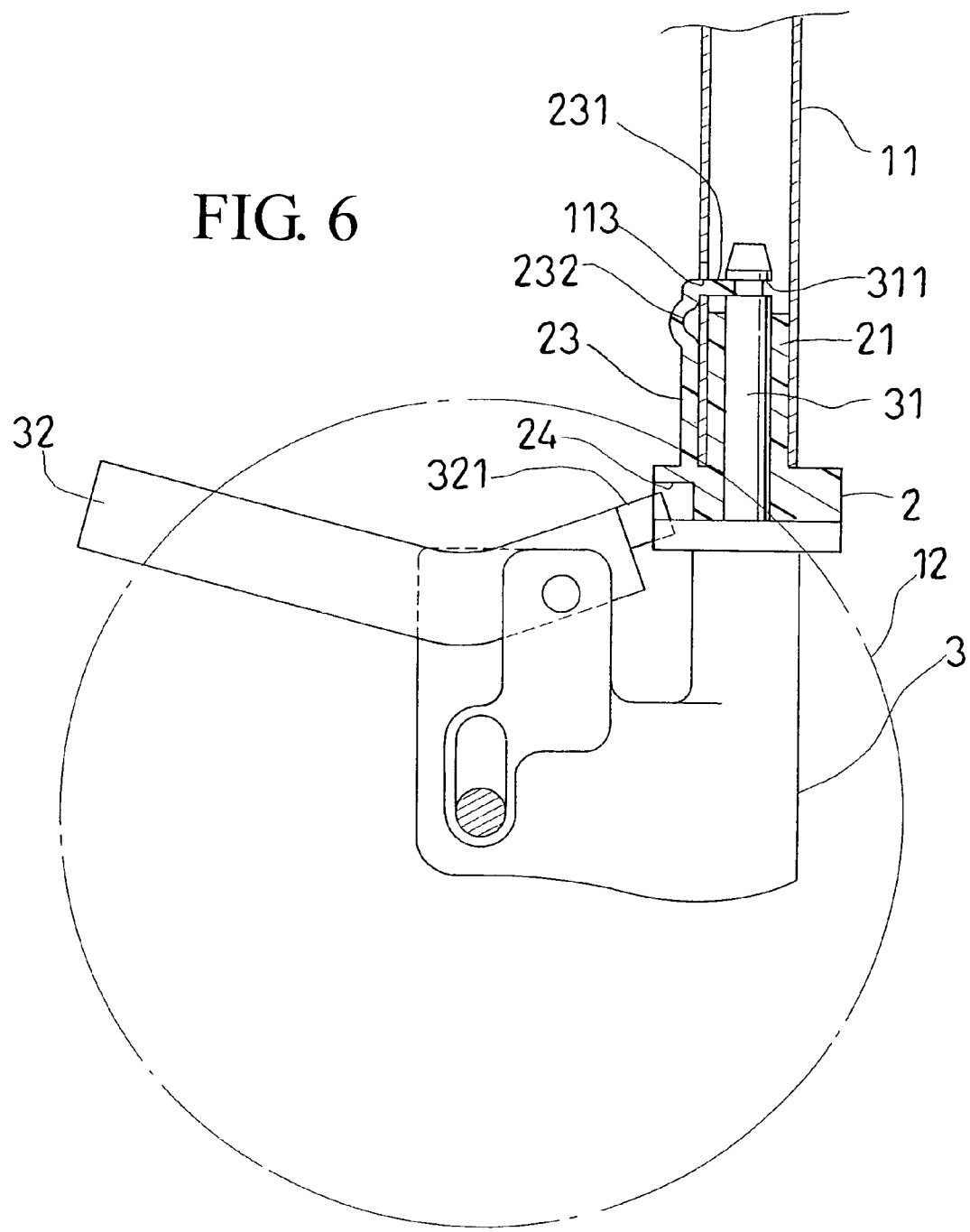
FIG. 6 is a schematic drawing showing a positioning block mounted into a positioning slot of an embodiment according to the present invention.
Figure 7:
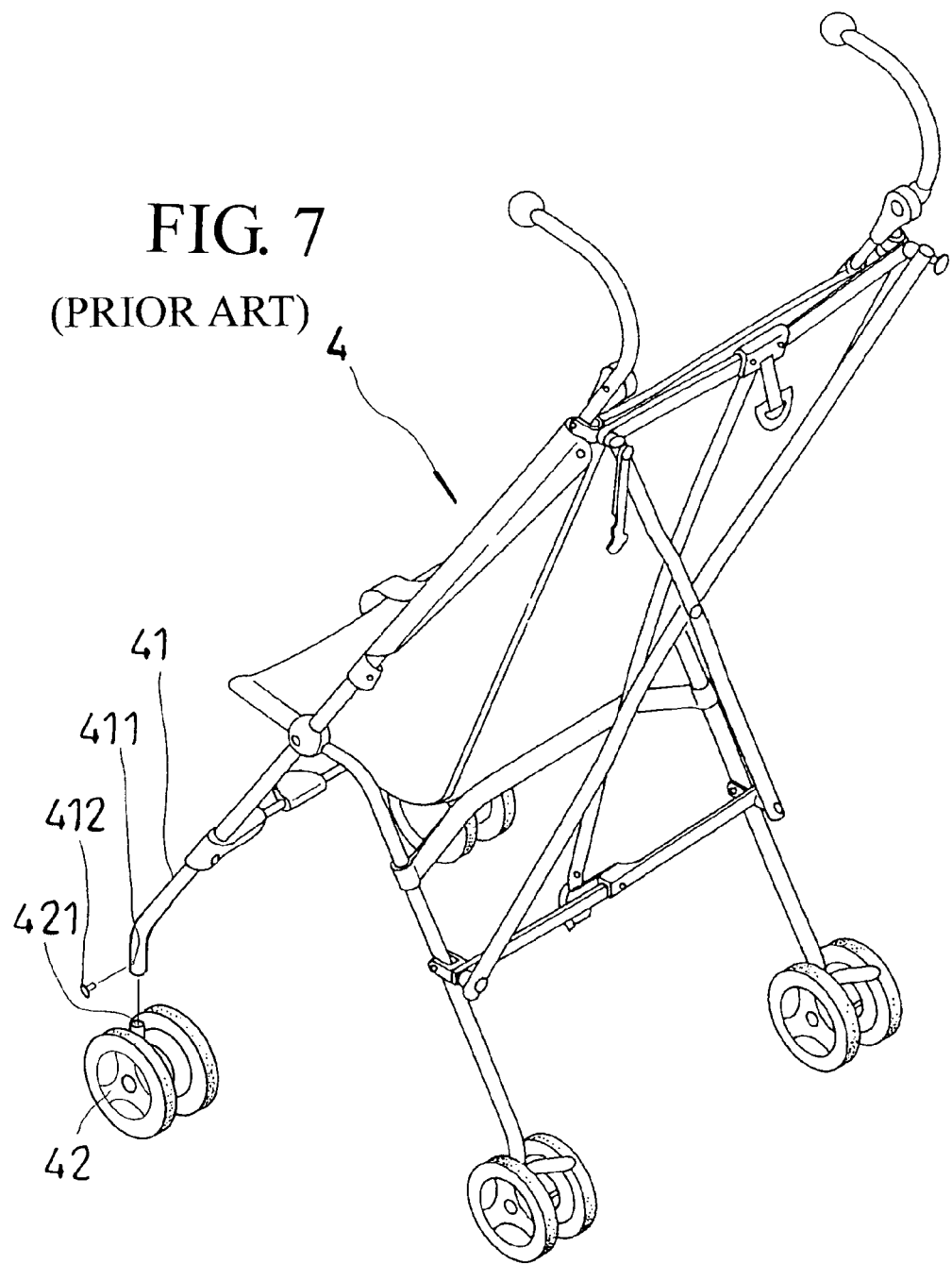
FIG. 7 is a perspective view of a stroller available now.

While pushing the stroller body (1), as shown from FIG. 1 to FIG. 5, the bending segment (231) on top end of the fixing pin (23) locked in the fixing groove (311) of the connection rod (31) moves along the side wall of the connection rod (31) so that each lower mount (3) and the wheel (12) can rotate in various directions. When the user wants to fix the wheel (12), refer to FIG. 6, only the positioning rod (32) of the lower mount (3) needs to be pressed downward so as to make the positioning block (321) of the positioning rod (32) move upward and lock into the positioning slot (24) on the bottom of the upper mount (2). Thus each wheel (12) on front end of the stroller body (1) is fixed to move straight without changes in directions.

Compared with the structure available now, the present invention has following advantages:
1. An upper mount and a lower mount are respectively disposed on the bottom end of each leg support on front end of the stroller body for easy assembling and disassembling of the wheels so as to achieve purposes of convenient assembling, storage and transportation.
2. The upper mount and the lower mount of the present invention are arranged with corresponding positioning slot and positioning rod. Thus only the positioning rod of the lower mount needs to be pressed to be locked into the positioning slot of the upper mount, each wheel on front side of the stroller body keeps moving forward without changes in directions.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A quick release structure for front wheels of baby strollers comprising
   a stroller body,
   an upper mount disposed on a leg support of the stroller body,
   a fixing pin arranged at the upper mount and a locking hole disposed on a side wall of the leg support with the fixing pin inserted into the locking hole;
   a lower mount disposed with a wheel being arranged at a bottom of the upper mount;
   a connection rod disposed projectingly on top of the lower mount and inserted through the upper mount,
   a fixing groove for locking with the fixing pin arranged around the connection rod,
   a positioning rod with a projective positioning block pivoted to the lower mount, and
   a positioning slot disposed on a bottom of the upper mount, receiving to the positioning block.

2. The device as claimed in claim 1, wherein the leg support is disposed with an insertion hole that receives a bolt and a connecting cylinder is arranged at the upper mount and is inserted into the leg support; the connecting cylinder is mounted with a bolt hole that keeps the bolt fastened.

3. The device as claimed in claim 1, wherein said fixing pin is bent to form a bending segment and the bending segment is inserted into the locking hole.

4. The device as claimed in claim 1, wherein a slot is formed on the fixing pin.

* * * * *